Aug. 14, 1951     J. L. SHELTON     2,564,509
SPRING SUSPENSION FOR AUTOMOBILES
Filed Jan. 11, 1946     3 Sheets-Sheet 1
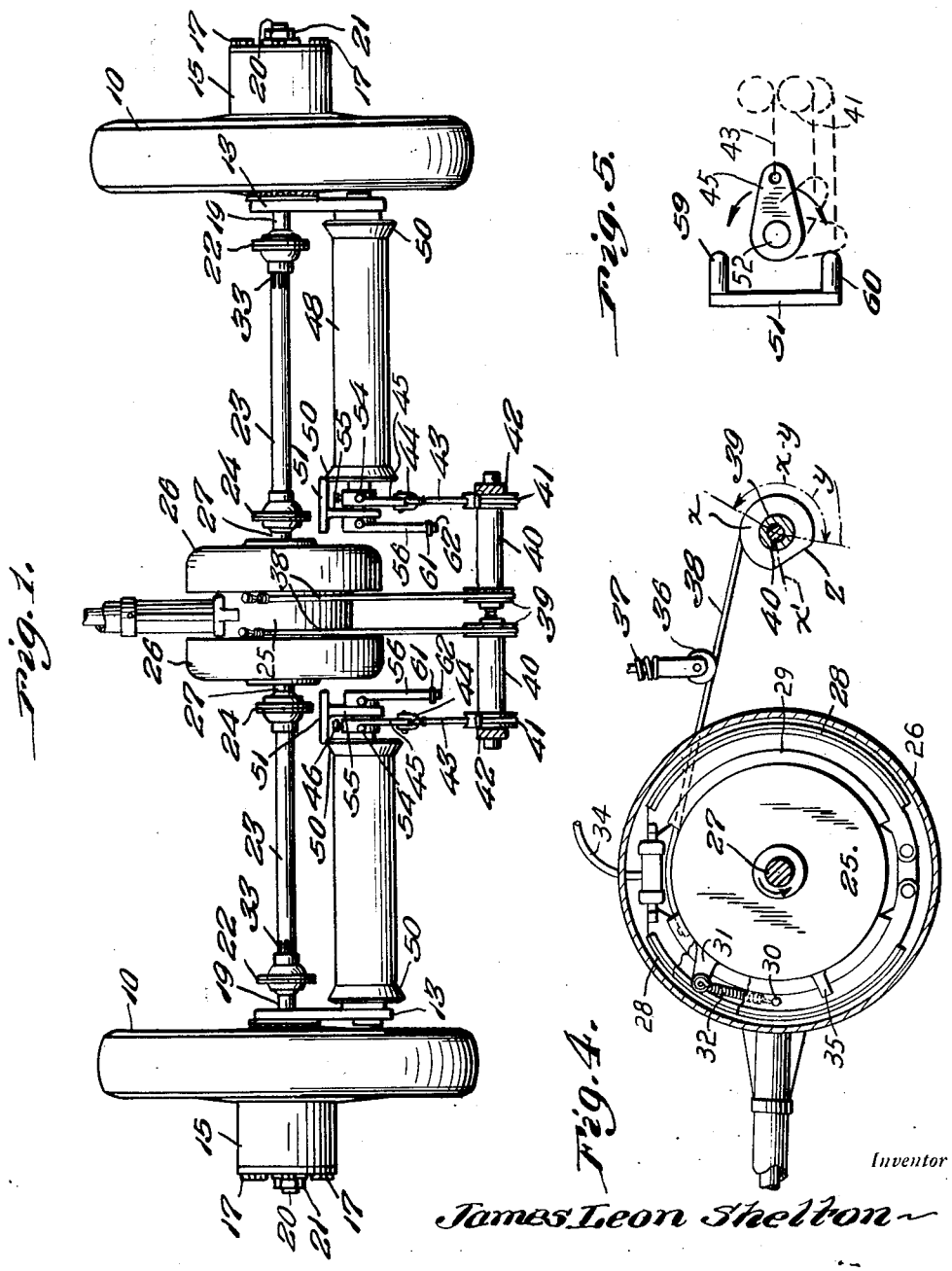
Inventor
James Leon Shelton
By Clarence A. O'Brien and Harvey B. Jacobson
Attorneys Aug. 14, 1951      J. L. SHELTON      2,564,509
SPRING SUSPENSION FOR AUTOMOBILES
Filed Jan. 11, 1946      3 Sheets-Sheet 2
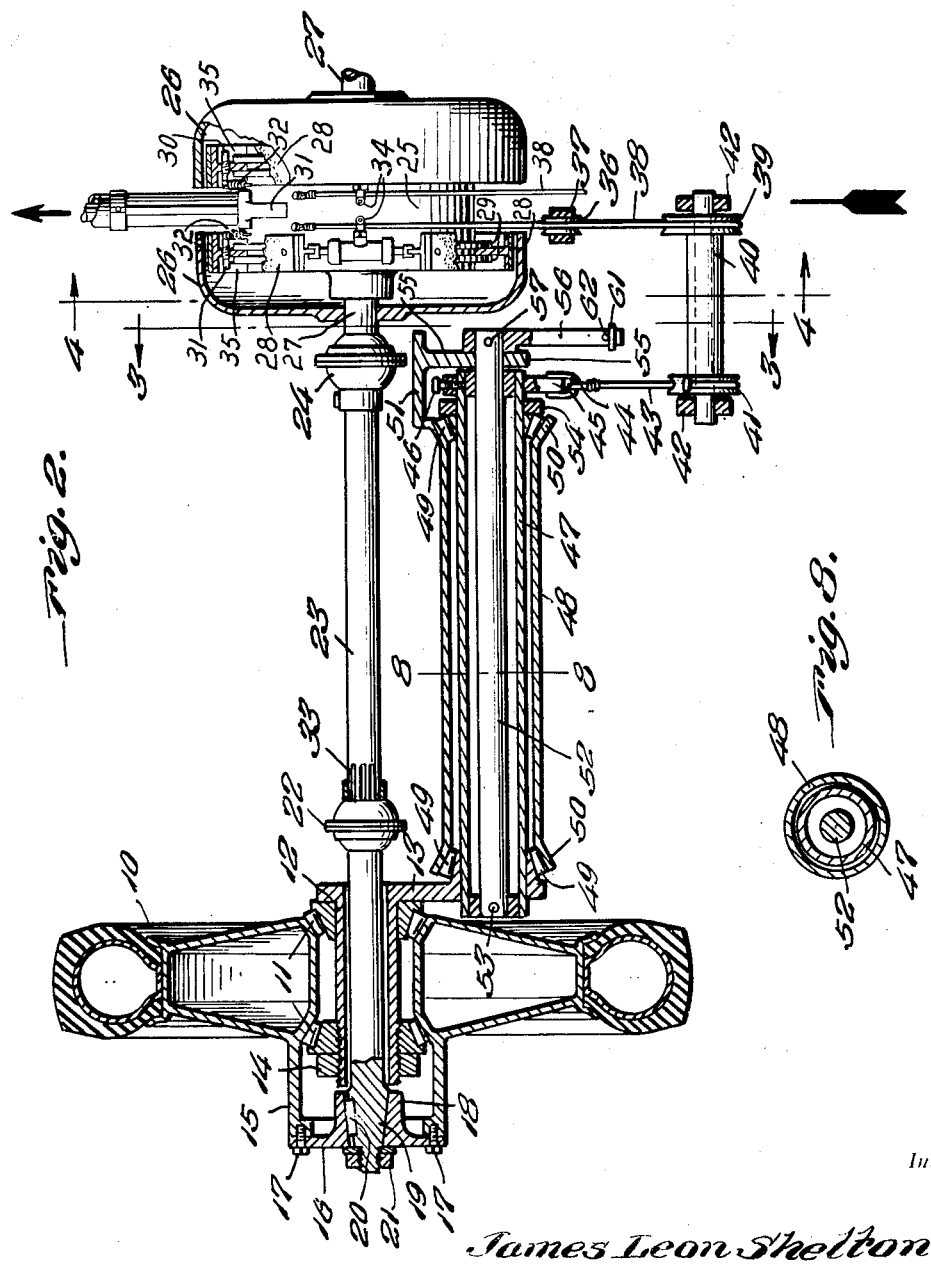
Inventor
James Leon Shelton
By Clarence A. O'Brien
and Harvey B. Jacobson
Attor

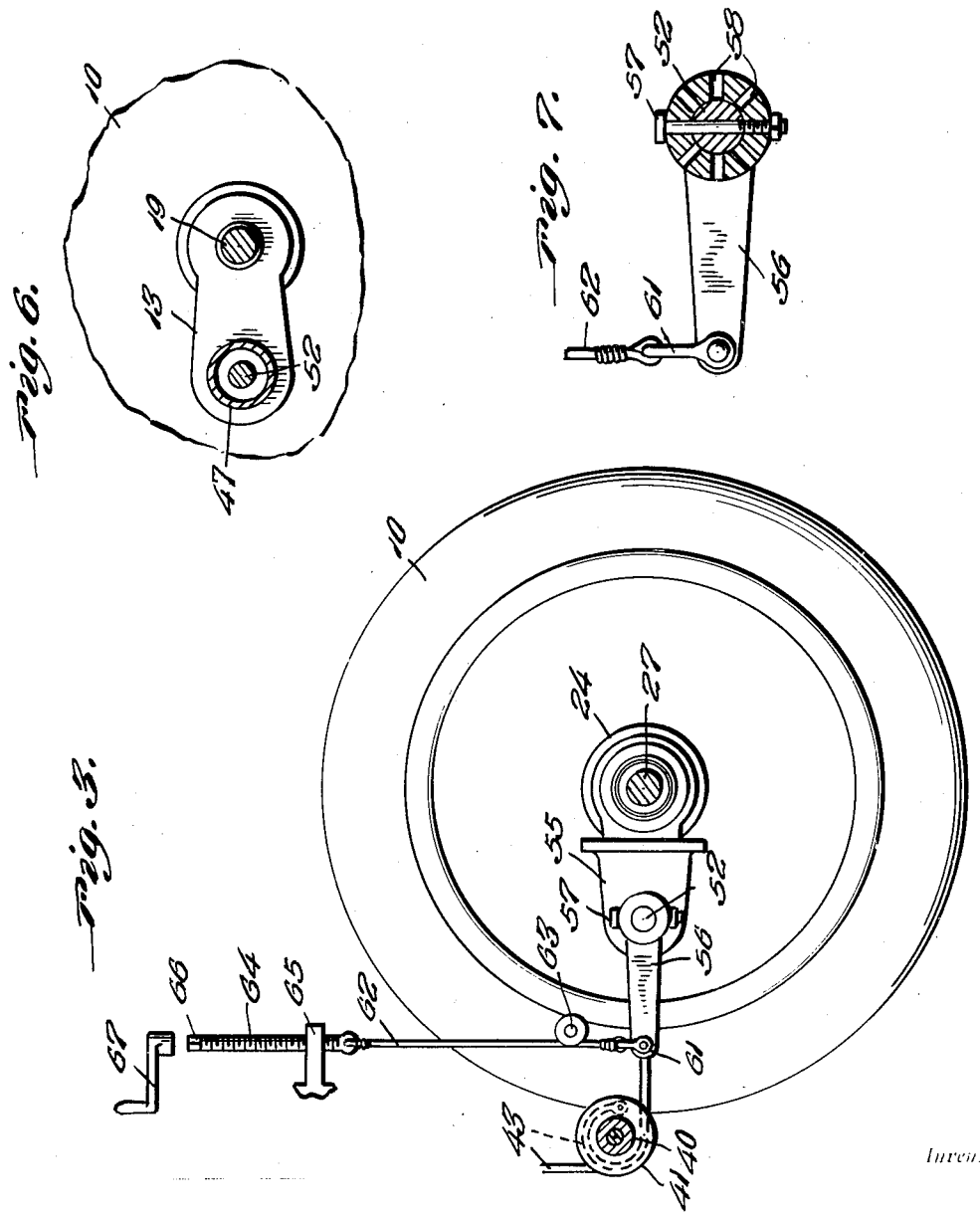

Patented Aug. 14, 1951

2,564,509

UNITED STATES PATENT OFFICE 2,564,509

SPRING SUSPENSION FOR AUTOMOBILES

James Leon Shelton, Wauchula, Fla.

Application January 11, 1946, Serial No. 640,623

13 Claims. (Cl. 180—73)

My invention relates to a compensating torsion bar spring suspension for automobiles, and the object thereof is to provide a simple and novel spring supporting construction adapted to be used in connection with the wheels of an automobile and its axles, but primarily for the driving wheels thereof, although capable of application to the other wheels of the automobile, to improve the spring action and increase the riding comfort of an automobile.

The invention is based on the principle that when the wheel and tire strike an obstacle, it moves upwards and backwards with the axle spindle in a circular path about the center of torsion of the bar as the center of rotation. This increases the torsional strain on the torsion bar, so that when the wheel has passed over an obstacle, the torsion bar returns the wheel to its original position. This action is used in connection with a floating brake assembly so as to increase the torsion applied to the alignment axle by the brake lever arm and upon the spring structure depending upon the position which the wheel assumes, while the tension on the brake lever arm and therefore, upon the alignment axle, depending on the braking force and being reduced upon the brakes being released, thereby providing for a very efficient and desirable spring action which improves riding comfort and increases traction of the wheels as well as preventing injury and damage to the parts affected.

Another object of the invention is to provide an improved mounting for the wheel axles or spindles so that each may operate independently, and including universal joints in connection with the improved spring suspension structure for each wheel, and more especially the drive wheels thereof, for increasing the riding comfort of an automobile by reducing the unsprung weight of the automobile and allowing each driving wheel to act without affecting the other wheel as well as providing a means of changing the spring tension so that the same can be made proportional to the load in the automobile in that when the wheel strikes an obstacle or a bump is encountered, the wheel travels backwards and it takes a longer time for the wheel to reach the top of a given obstacle, thereby improving the riding qualities, while the spring tension is increased but is more gradual than it is with a conventional springing system.

Another object of the invention is to provide a compensation spring suspension having a torsion bar spring structure which may be economically produced and readily assembled when applied to automobiles as at present constructed or of special construction, in combination with the rear drive axles and floating brake assembly associated with the differential, brake drums and other structure, which may be located in the center of the axle housing instead of at the wheel, the structure being of novel and efficient action, strong and durable and not likely to get out of working order.

Other objects and advantages reside in the details of construction and operation as more fully hereinafter described and claimed, reference being had to the accompanying drawings forming part hereof, wherein like numerals refer to like parts throughout, and in which:

Figure 1 is a plan view of a rear axle structure showing my improved compensating torsion bar spring suspension.

Figure 2 is an enlarged elevational view of one side of Figure 1, some parts being shown in section.

Figure 3 is a section taken on the line 3—3 of Figure 2.

Figure 4 is a section taken on the line 4—4 of Figure 2.

Figure 5 is a fragmentary detail of part of the suspension structure and showing the action thereof.

Figure 6 is a fragmentary sectional elevation.

Figure 7 is another fragmentary sectional elevation of the arrangement shown in Figure 3, and Figure 8 is a sectional view taken on the line 8—8 of Figure 2.

Referring to the drawings in detail, 10 designates the wheel, the hub of which is designed to turn on anti-friction or roller bearings 11 at the wheel bearing tube or sleeve 12, each of which is provided with a radially extending lever arm 13 and a retaining nut 14 by which the wheel is retained on the bearings and sleeve at the outer side of the hub of the wheel, against the outer bearing. The wheel is provided with an integral or attached driving cap 15 which is rigid with the wheel hub closed by a removable cover or driving flange 16 bolted or otherwise removably secured thereto as at 17 and having an internal tapered flange 18 extending inwardly from the cap connected to the axle spindle 19 by a key or other suitable means 20 and then held by retaining nut or the like 21 on the projecting outer end of the spindle. The spindle, of course, passes through and rotates in the sleeve or tube 12 and is connected by a universal joint 22 to a drive shaft section 23 which is, in turn, connected by an inner universal joint coupling 24 to the axle section 27 associated with the differential gearing (not shown) in the stationary casing 25 partially closed over by brake drums, casings or housings 26 at each side, by being fixed to the short axle sections 27 inwardly of the universal joints or couplings 24. The floating brake assembly is indicated at 28 and is shown of T-shaped cross section held between guides or flanges 29 spaced apart for this purpose on the differential housing near each side or end thereof. A bracket 30 is interposed between each housing and floating brake assembly or brake shoes thereof, and provided with stops 31 to which springs 32 are connected from the floating brake assembly or ring to bracket or bracket arm 30 extending from the differential in casing 25. Universal joint 22 is splined at 33 to drive shaft 23 to permit extension or elongation of the length thereof between the differential and wheel. A hydraulic line 34 from the usual master cylinder operated by the brake pedal, in the usual way as on conventional automobiles, is shown leading to the floating brake assembly and brake shoes operated by the usual expansion pistons for engaging the brake drum internally and normally contracted and held out of engagement in the usual way, except that the same is located adjacent to the differential, instead of at the inside faces of the wheel in the customary spring and brake structure. An additional stop 35 is provided on the opposite side of the bracket 30 correspondingly spaced on the differential housing as is the stop or ear 31 to restrain the motion of the floating brake assembly when the brakes are applied as the car is traveling in reverse, as will be hereinafter explained.

A resiliently or spring suspended pulley 36 is hung from the frame or fixed part of the automobile as indicated at 37 and the pulley is engaged by a cable 38 which extends partially around and is anchored to a pulley 39 on the inner end of a torque tube 40 carrying a circular V-pulley 41 on its outer end and rotatably supported at its axis by brackets 42 from the frame or chassis or otherwise. Cable 38 is securely attached to the floating brake assembly 28 so that when the brakes are applied, a force is applied to the cable 38. A cable 43 is connected to and partially wound around the pulley 41 and its other end connected to a yoke and clevis pin 44 carried by the end of a lever or arm 45 adjustably bolted at 46 around the closed inner end of a tubular alignment axle 47 which, at its other end, extends through the wheel lever arm 13 fixed to the wheel bearing tube 12 at its inner end and on which the wheel is driven and rotated through the hub cap upon the roller bearings 11. It will be noted that the wheel lever arm 13 and lever arm 45 are parallel to each other and extend rearwardly from tube 12 and tube 47, respectively, but in diametrically opposite positions or directions from tube 47 in a horizontal position normally, in connection with the parts supported thereby, to swing up and down. It should also be noted that the pulleys 39 have a normal radius $x$ and from $x$ to $x'$ the radius of the pulley gradually decreases while from $x$ to $y$ in the opposite direction, $x$ is constant. The portion $z$ is straight, or flat, being a straight line adjoining $x'$ and $y$ as shown in Figure 4 of the drawings in connection with a segment of the floating brake assembly 28, cable 38 and pulley and spring assembly 36 and 37 engaging the cable and acting as a tightener supported from a bracket suitably carried by the vehicle frame. The purpose of this structure will be hereinafter more fully made apparent.

The tubular alignment axle 47 is adapted to turn within a main tubular axle 48 on interposed anti-friction or roller bearings 49 which serve as both supporting bearings and end thrust bearings by reason of the outwardly flanged or conical enlargements at the ends of the main tubular axle 48, as indicated at 50, which is of like construction on both ends, one-half section being shown in the drawings. The main axle 48 is formed with the enlarged intermediate portion or housing 51 of which the axle sections 48 form a part, the wheel lever arm 13 being engaged on the projecting outer end of the tubular alignment axle 47 and extending around the same as shown. An inner torsion bar 52 which is the spring in this mechanism is disposed to turn at its inner end within the tubular alignment axle 47 and has its outer end bolted to the tubular alignment axle 47 as indicated at 53, the end of the tubular alignment axle 47 being closed at this point if desired and the bolt extending diametrically through said parts.

At the opposite end of the tubular alignment axle 47, a retaining nut 54 is mounted thereon outside of the inner bearing, said end being externally threaded for this purpose and the nut retaining the parts in assembled relation as described and shown. A bracket 55 also extends from the central housing portion 51 to receive and support the torsion bar 52 in such manner that it can be rotated at its inner end which projects further and has mounted thereon, a torsion bar twisting lever 56, which is fixed or bolted thereto as indicated at 57, and capable of adjustment, by reason of a plurality of aligned diametrical openings through the sleeve of the lever, as indicated at 58 in Figure 7 to regulate the spring tension and torsion thereon exerted through the torsion bar to the wheels. The lever arm 45, which is mounted on the tubular axle 47 outwardly of the retaining nut 54, is limited in its movements in opposite directions as indicated by the arc in Figure 5 of the drawings of 180° or approximately so, or 90° at either side, upwardly and downwardly, by flexible cushion or rubber bumpers or stops 59 and 60 fixed at either side thereof in the path of the lever arm 45 to the intermediate portion 51 of the axle housing or center part of the main axle 48. This structure limits the motion of the wheel lever arm and wheel by limiting the motion of the lever arm as will be readily apparent. The special formation of the pulley 39 with a partial concentric surface of uniform radius and another portion of gradually decreasing radius in addition to the portion of constant radius and the segmental flat portion on a straight or rectilinear line, serves to cause the torque on the alignment axle 47 due to the stress in cable 43 to increase as the lever arm 45 moves toward the vertical position and vice versa. That is, this torque decreases when the lever arm 45 moves toward a horizontal position. Thus, the function of the pulley 39 is to cause the torque to increase and to move in such a way as to keep the cable 43 parallel to its original normal line of action in any of its positions and that of lever arm 45 between horizontal and vertical as depicted in Figure 5 of the drawings in solid and dotted lines. The center line of the automobile and the direction of motion is designated by the arrow pointing upwardly in Figure 2, the parts shown therein being duplicated on each end as it is thought will be well understood.

Attached to the torsion bar twisting lever 56, as by means of a clevis 61, in addition to the adjustment described in connection with Figure 7, as shown more particularly in Figure 3 of the drawings, is a cable 62 which engages a suitably supported pulley 63 to prevent side loads from being imposed on the screw 64 which operates through a nut 65 rigidly attached to the automobile frame. The opposite end of the cable 62 is attached to the screw 64 as shown in Figure 3 of the drawings, and the screw has a squared end 66 adapted to be engaged by a crank handle 67 for adjusting the tension on the torsion bar 52 in conjunction with the several holes drilled radially around the attaching flange or hub of the torsion bar twisting lever 56 so that the latter may be attached to the torsion bar in several positions. The upper end of the screw is in convenient position for attachment of the crank handle and for turning the same to adjust the tension on the torsion bar as described.

In the operation of the device, when the wheel strikes an obstacle, it moves upwards and backwards in a circular path about the center of the torsion bar 52 as the center of rotation. This increases the torsional strain in the torsion bar so that when the wheel has passed over the obstacle, the torsion bar returns the wheel to its original position. When the wheel rotates about the torsion bar 52, the alignment axle 47 rotates within the main axle 48 and rotates the lever arm 45, which as soon as it is rotated out of its normal position which is parallel to the road, unwinds the cable 43 from the pulley 41. This winds up cable 38 on the pulley 39 and unwinds the same from the floating brake assembly 28 to stretch the spring 32. When the wheel returns to its normal position, the strain is removed from the cables 38 and 43 and the spring 32 returns the floating brake assembly to its original position. When the brakes are applied, cable 38 restrains the motion of the floating brake assembly 28 and transmits braking torque through the pulley 39 to the pulley 41 and thus to the cable 43 which in turn applies this braking force to the alignment axle 47 by means of the lever arm 45. The purpose of applying this braking force to alignment axle 47 is to counteract that force which would otherwise be applied to the torsion bar 52 when the brakes are applied and wheel lever arm 13 is not parallel to the road surface. The purpose of the stop 31 is to restrain the motion of the floating brake assembly 28 if the cables 38 should break. The purpose of the stop 35, is to restrain the motion of the floating brake assembly 28 when the brakes are applied as the car is traveling in reverse. The pulley and spring assembly 36 and 37 keeps the cables 38 and 43 tight when the brakes are applied if the car is traveling in reverse. The flexible stops 59 and 60 limit the travel of the lever arm 45 to a maximum arc of 180°. These stops are easily replaceable and a change in the length thereof to limit the arc through which the lever arm 45 travels may be affected in this manner to a value less than 180°, which would improve riding qualities under certain conditions. Assuming a constant force applied to the special pulley 39, by cable 38, that is, braking torque from brake assembly 28, as the cable 38 is wound upon special pulley 39 by rotation of the lever arm 45 out of its normal position parallel to the road, the radius of the special pulley 39 changes in such a way as to decrease and then increase its mechanical advantage. The changing mechanical advantage of the pulley 39, causes the pulley 41 to apply to the lever arm 45, a restoring force which would be approximately equal to the restoring force that would be applied to the lever arm 45 by original force acting parallel to its original line of action. In this way, the special pulley causes the torque to be applied with increasing or decreasing effect in opposite directions of movement in the angular position of the lever arm 45 in an angle between a horizontal position and a vertical position or 90°.

In this way, and by means of the construction described, the driving comfort of an automobile is improved and increased, the unsprung weight of the automobile being reduced, allowing each driving wheel to act without affecting the other wheel. By providing a means of changing the spring tension so that the same can be made proportional to the load in the automobile, and since the wheel travels backwards when a bump is encountered, it takes a longer time for the wheel to reach the top of a given obstacle, and therefore the riding qualities are improved because the increase in spring tension is more gradual than it is in conventional springing systems. Tire wear is also decreased, by mounting the wheel in a way that the tire is never scuffied, shifted or scruffed sideways so that it is always kept perpendicular to the road. The construction is very strong and rugged and any change in the stress of the torsion bar can be kept very small or low, so as to decrease the spring fatigue. The construction prevents all forces except the weight of the automobile from being applied to the spring and by mounting the wheels on tubular hubs which are held in place by retaining nuts and roll upon bearings as described, the wheel is driven by the drive shaft which passes through the center of the hub and is keyed to the driving flange and cap, to drive the wheel. The universal joints 22 and 24 incorporated in the drive shaft, allow the wheels to move in any direction and the spline 33 allows the shaft to elongate as required. The drive shaft 23 is driven by the conventional differential in casing 25 and with the wheel lever arm 13 perpendicular to the hub 12, and alignment axle 47, and connecting the two rigidly, the wheel lever arm 13 in its normal position is parallel to the road and the alignment axle 47 is free to turn in the main axle 48 upon the bearings 49 and is held in position by the retaining nut 54. The main axle 48 is rigidly connected to the central part of the main axle or housing 51 through which it is connected to the main axle on the other side of the differential, as shown in Figure 1 in a similar manner, and thus a rigid member is provided between the wheels forming an axle housing, which carries the weight of the car. The spring suspension is through the medium of the torsion bar or bars 52 which is attached to the alignment axle 47 at its outer end and supported by the bracket 55 at its inner end in such a manner that it can be rotated. The torsion bar 52 is attached to the torsion bar twisting lever 56 in such a manner that it can be adjusted to several different positions through the medium of the bolt 57 and the openings 58 for adjusting the tension on the torsion bar which is twisted to the extent necessary to hold the wheel lever arm 13 parallel to the road when the automobile is at rest on a level surface. The construction which accomplishes this is shown in Figure 3 of the drawings. The lever arm 45 is attached perpendicular to the alignment axle 47 and parallel to the wheel lever arm 13 and the brake assembly is mounted on the differential 25 so that it is free to rotate within fixed limits. The spring 32 is under tension and tends to rotate the brake in the direction of wheel rotation and keeps the cables 38 and 43 under tension. The pulleys 39 and 41 are rigidly connected by the torque tube 40 so that a force applied on the cable 38 is transmitted through both the pulleys to the cable 43 which in turn transmits the force to the lever arm 45 and thus the alignment axle 47 and by reason of the cable 38 being securely attached to the floating brake assembly 28, when the brakes are applied, a force is applied to the cable 38, as will be readily seen from Figure 4 of the drawings, and by providing the stops 31 and 35 on the floating brake assembly, by contact with the bracket 30, under certain operating conditions, they prevent the brake assembly from rotating farther.

In reference to the special function of the variable radius of the pulley 39, when the brakes are aplied and the lever arm 13 is parallel to the road, there is no torque applied to the alignment axle 47. However, when the lever arm 13 is moved and is not parallel to the road, a torque is applied to the alignment axle 47 which is equal to the restoring force applied to the lever arm 45 by the original force acting parallel to its original line of action, the perpendicular distance between the two lines passing through the centers of the axle spindle 19 and the alignment axle 47, these lines being kept parallel to the road and braking force. The restoring force acting through the cable 43 would produce a torque upon the alignment axle 47 by pulling on the lever arm 45 which would be equal in magnitude and opposite in direction to the above-mentioned torque if the pulley 41 were allowed to move as indicated in Figure 5 of the drawings so that the cable 43 is kept parallel to the road, but since it is not practical to let the pulley 41 move, the same effect is obtained by varying the radius of one of the pulleys, in this case the pulley 39. This pulley changes the force in the cable 43 so that the same force is applied to the lever arm 45 as would be applied thereto if the pulley 41 were allowed to move downward as above set forth, or if the lever arm 13 is allowed to rotate in the opposite direction, but with very slight variation. The floating brake assembly is a compensating device for the purpose of applying a torque to the alignment axle 47, which will oppose and be approximately equal to that force caused by the inertia of the vehicle tending to rotate the lever arm 13 to such a position that the point of contact of the tire with the road surface would be to the rear of the center of the torsion bar. This torque on the alignment axle 47 caused by the inertia of the vehicle occurs only when the brakes are applied when the lever arm 13 is not parallel to the road. Tension is applied to the lever arm 45 whenever the brakes are applied but this tension upon the alignment axle 47 is not converted into torque upon alignment axle 47 until the alignment axle 47 rotates lever arm 45 out of a position parallel to the road surface. A mechanical advantage of the variable radius pulley 39 and its special formation as described, is to produce a varying leverage or to give a mechanical advantage by varying its radius, so that assuming a constant force on the cable 38, the force on the cable 43 varies in such a way as to produce the same torque on the alignment axle 47, as it rotates out of the horizontal position, as would be produced by the original force acting parallel to the road. In other words, the leverage of one of the pulleys changes, but this change in leverage serves only to compensate for the force on the cable 43 changing its line of action.

While in the foregoing there has been shown and described the preferred embodiment of this invention it is to be understood that minor changes in the details of construction, combination, and arrangement of parts may be resorted to without departing from the spirit and scope of the invention as claimed.

I claim:

1. In a vehicle, a frame, a torsion member mounted in the frame, a wheel having a bearing sleeve connected to the torsion member, an axle having a spindle extending through the bearing sleeve and connected to the wheel, said axle adapted for universal angular movement at spaced points inwardly of the bearing and wheel, means acting upon said torsion member for providing changing spring tension on the wheel proportional to the load thereon, and means for adjusting said tension, said first means including a floating brake assembly and means between the floating brake assembly and the torsion member to apply the tension upon angular movement of the wheel or upon applying the brake.

2. In a vehicle, a frame, a torsion member mounted in the frame, a wheel having a bearing sleeve connected to the torsion member, an axle having a spindle extending through the bearing sleeve and connected to the wheel, said axle adapted for universal angular movement at spaced points inwardly of the bearing and wheel, means acting upon said torsion member for providing changing spring tension on the wheel proportional to the load thereon, and means for adjusting said tension, said first means including a floating brake assembly, means between the floating brake assembly and the torsion member to apply the tension upon angular movement of the wheel or upon applying the brake, and means to limit the movements in either direction, when traveling forward or in reverse.

3. In a vehicle, a frame, a bearing member carried by the frame, a torsion member rotatably mounted in said bearing member, a wheel having a bearing member connected radially to the torsion member, a spindle within the wheel, an axle having a universal joint connection with the spindle, said wheel being connected to the spindle at its outer end, a lever arm connected to the inner end of the torsion member, said torsion member being offset horizontally from the axle, a brake member coaxially of the axle and spindle, and oppositely acting tension means between the brake member and the lever arm to apply resisting tension and torque on the torsion member upon movement of the wheel in opposite directions and upon applying the brake.

4. In a vehicle, a frame, a bearing member carried by the frame, a torsion member rotatably mounted in said bearing member, a wheel having a bearing sleeve connected radially to the torsion member, a spindle within the wheel, an axle having a universal joint connection with the spindle, said wheel being connected to the spindle at its outer end, a lever arm connected to the inner end of the torsion member, said torsion member being offset horizontally from the axle, a brake member coaxially of the axle and spindle, driving means having universal connection with the axle, cables connected to the brake member and lever arm, connected pulleys journaled in the frame and upon which the ends of the cables are wound, and means for adjusting the tension on the torsion member.

5. In a vehicle, a frame, a bearing member carried by the frame, a torsion member rotatably mounted in said bearing member, a wheel, a stationary bearing sleeve for the wheel connected radially to the torsion member, a spindle within the wheel, an axle having a universal joint connection with the spindle, said wheel being connected to the spindle at its outer end, a lever arm connected to the inner end of the torsion member, said torsion member being offset horizontally from the axle, a brake member coaxially of the axle and spindle, driving means having universal connection with the axle, cables connected to the brake member and lever arm, connected pulleys journaled in the frame and upon which the ends of the cables are wound in opposite directions, spring means resisting the movements of said cables and means for limiting the movements of the torsion member and lever arm in opposite directions to cushion the up and down movements of the wheel and downward movements of the vehicle frame.

6. In a vehicle, a frame, a bearing member carried by the frame, a torsion member rotatably mounted in said bearing member, a wheel having a bearing sleeve connected radially to the torsion member, a spindle within the wheel, an axle having a universal joint connection with the spindle, said wheel being connected to the spindle at its outer end, a lever arm connected to the inner end of the torsion member, said torsion member being offset horizontally from the axle, a brake member coaxially of the axle and spindle, driving means having universal connection with the axle, cables connected to the brake member and lever arm, connected pulleys journaled in the frame and upon which the ends of the cables are wound, in opposite directions, spring means resisting the movements of said cables, one of said pulleys having a portion of constant radius, a portion of gradualy changing radius and a straight portion therebetween to successively decrease and increase the leverage on the tension means with a restoring force on the lever arm opposing the force acting on the torsion member and causing the torque to remain the same and constant at all angular positions of the lever arm.

7. A knee action torsion bar spring for vehicles comprising an axle, a wheel bearing sleeve on the axle, a wheel journaled on the sleeve, said axle being connected to the wheel hub at the outer side thereof, a brake member centrally of the axle, a tubular bearing member supported in the frame of the vehicle parallel to and offset horizontally from the axle, a tubular member rotatable therein, a torsion bar in and anchored at one end to one end of said rotatable tubular member and supported in fixed relation to the vehicle frame and tubular bearing member at its free end, an arm connecting the wheel bearing sleeve with the rotatable tubular member, a lever arm connected to the opposite end of said rotatable tubular member and oppositely acting cable winding means between the lever arm and the brake member to vary the spring tension and torsion on the torsion bar in proportion to the load on the vehicle.

8. In a compensating torsion bar spring suspension for vehicles, a frame, a differential drive centrally of the width of the frame having a housing, axles extending from opposite sides of the differential and comprising sections having universal coupling joints adjacent to the housing and outwardly thereof, said latter couplings adapted to permit elongation of the axles, a wheel bearing tube, a wheel rotatable thereon, a spindle on each end of the axle outwardly of the outer universal joint and extending through the bearing tube for connection to the wheel at the outside of the hub thereof, an arm connected to each bearing tube and extending horizontally therefrom, a tubular main axle connected to the frame, an alignment axle rotatable therein, and connected to the arm of each wheel, a torsion bar within each alignment axle and connected thereto at its outer end, a lever arm fixed to the inner end of each alignment axle and adjustable circumferentially thereon, a bracket, a floating brake assembly on the differential housing on either side of the bracket, spring connections between the housing and brake assemblies including stops limiting the movement thereof in rotating in opposite directions, pulleys having connected shafts journaled in the frame beyond the horizontal extension of the wheel arm and the lever arm, a cable connected to each lever arm and wound upon one pulley, and a cable connected to the brake assembly and wound in an opposite direction upon the other pulley, and means for adjusting the tension on the torsion bars.

9. In a compensating spring suspension for vehicles, a frame, a differential drive centrally of the width of the frame having a housing, axles extending from opposite sides of the differential and comprising sections having universal coupling joints adjacent to the housing and outwardly thereof, said latter coupling adapted to permit elongation of the axles, a wheel bearing tube, a wheel rotatable thereon, a spindle on each end of the axle outwardly of the outer universal joint and extending through the bearing tube for connection to the wheel at the outside of the hub thereof, an arm connected to each bearing tube and extending horizontally therefrom, a tubular main axle connected to the frame, an alignment axle rotatable therein, and connected to the wheel arm of each wheel, a torsion bar within the alignment axle and connected thereto at its outer end, a lever arm fixed to the inner end of the alignment axle and adjustable circumferentially thereon, a bracket, a floating brake assembly on the differential housing on either side of the bracket, spring connections between the housing and brake assemblies including stops limiting the movement thereof in rotating in opposite directions, pulleys having connected shafts journaled in the frame beyond the horizontal extension of the wheel arms and the lever arms, a cable connected to each lever arm and wound upon one pulley, and a cable connected to the brake assembly and wound upon the other pulley, said cables being wound on the pulleys in opposite directions, one pulley having a variable radius portion and a portion of constant radius to vary the leverage between the brake assembly and the torsion bar upon rotation thereof, means for holding the cables connected to both of the pulleys taut, and means connected to the torsion bar for adjusting the tension thereon.

10. In a compensating spring suspension for vehicles, a frame, a differential drive centrally of the width of the frame having a housing, axles extending from opposite sides of the differential and comprising sections having universal coupling joints adjacent to the housing and outwardly thereof, said latter coupling adapted to permit elongation of the axles, a wheel bearing tube, a wheel rotatable thereon, a spindle on each end of the axle outwardly of the outer universal joint and extending through the bearing tube for connection to the wheel at the outside of the hub thereof, an arm connected to each bearing tube and extending horizontally therefrom, a tubular main axle connected to the frame, an alignment axle rotatable therein, and connected to the arm of each wheel, a torsion bar within the alignment axle and connected thereto at its outer end, a lever arm fixed to the inner end of the alignment axle and adjustable circumferentially thereon, a bracket, a floating brake assembly on the differential housing on either side of the bracket, spring connections between the housing and brake assemblies, stops limiting the movement thereof in rotating in opposite directions, pulleys having connected shafts journaled in the frame beyond the horizontal extension of the wheel arms and the lever arms, a cable connected to each lever arm and wound upon one pulley, and a cable connected to the brake assembly and wound upon the other pulley, said cables being wound on the pulleys in opposite directions, one pulley having a variable radius portion and a portion of constant radius to vary the leverage between the brake assembly and the torsion bar upon rotation thereof, means for holding the cable connected to both of the pulleys taut, and means connected to the torsion bar for adjusting the tension thereon, said means comprising a torsion bar lever extending from the inner end of said torsion bar, a cable connected thereto, means carried by the frame for adjusting the pull on the cable, and means to prevent side loads from being imposed on the latter means.

11. In a vehicle, a frame, a torsion member mounted in the frame and offset therefrom horizontally, a wheel having a bearing sleeve connected to the torsion member, a tubular member connected to one end of the torsion member and mounted in the frame, a lever arm connected to the inner end of the tubular member, a wheel arm connected to the outer end of the tubular member and extending rearwardly from the bearing sleeve parallel to the lever arm, said lever arm extending rearwardly, an intermediate brake assembly, a differential housing enclosing a differential for driving the axle, a brake assembly mounted around the housing, and resilient cable means between the brake assembly and the lever arm tending to increase the torsional strain on the torsion member and to return the wheel to normal position.

12. In a vehicle, a frame, a torsion member mounted in the frame and offset therefrom horizontally, a wheel having a bearing sleeve connected to the torsion member, a tubular member connected to one end of the torsion member and mounted in the frame, a lever arm connected to the inner end of the tubular member, a wheel arm connected to the outer end of the tubular member and extending rearwardly from the bearing sleeve parallel to the lever arm, said lever arm extending rearwardly, an intermediate brake assembly, a differential housing enclosing a differential for driving the axle, a floating brake assembly mounted around the housing, and oppositely acting resilient cable means to restrain motion of the floating brake assembly and transmit braking torque to the torsion member upon application of the brakes to counteract the force which would otherwise be applied to the torsion member when the brakes are applied and the wheel arm is not parallel to the road surface.

13. In a vehicle, a frame, a torsion member mounted in the frame and offset therefrom horizontally, a wheel having a bearing sleeve connected to the torsion member, a tubular member connected to one end of the torsion member and mounted in the frame, a lever arm connected to the inner end of the tubular member, a wheel arm connected to the outer end of the tubular member and extending rearwardly from the bearing sleeve parallel to the lever arm, said lever arm extending rearwardly, an intermediate brake assembly, a differential housing enclosing a differential for driving the axle, a brake assembly mounted around the housing, and means to place the torsion member under tension to cause torque to be applied with increasing or decreasing effect in opposite directions of movement in the angular position of the lever arm and wheel arms in an angle between horizontal and vertical positions.

JAMES LEON SHELTON.

REFERENCES CITED

The following references are of record in the file of this patent:

UNITED STATES PATENTS

| Number | Name | Date |
|---|---|---|
| 2,059,908 | Rabe | Nov. 3, 1936 |
| 2,166,774 | Tjaarda | July 18, 1939 |
| 2,297,465 | Froehlich | Sept. 29, 1942 |

FOREIGN PATENTS

| Number | Country | Date |
|---|---|---|
| 419,291 | Great Britain | Nov. 5, 1934 |
| 770,709 | France | July 2, 1934 |